United States Patent [19]

Cook

[11] 4,072,242
[45] Feb. 7, 1978

[54] UNLOADING TAILGATE FOR SELF-UNLOADING FORAGE WAGON

[76] Inventor: Franklin F. Cook, Rte. 2, Baraboo, Wis. 53913

[21] Appl. No.: 573,041

[22] Filed: Apr. 30, 1975

[51] Int. Cl.² ............................................. B60P 1/38
[52] U.S. Cl. ................................. 214/522; 214/83.26; 214/85
[58] Field of Search ............... 214/518, 519, 521, 522, 214/83.26, 85, 85.1, 38 BB; 296/24 C, 61; 198/692

[56] References Cited

U.S. PATENT DOCUMENTS

| | | | |
|---|---|---|---|
| 1,415,034 | 5/1922 | Hoelscher | 214/522 |
| 1,558,164 | 10/1925 | Haney | 214/522 |
| 2,721,758 | 10/1955 | Allen | 296/61 |
| 3,430,732 | 3/1969 | Lachance et al. | 214/38 BB X |
| 3,724,634 | 4/1973 | Miskin | 198/692 |
| 3,878,670 | 4/1975 | Adee et al. | 214/522 X |
| 3,886,719 | 6/1975 | Garrison et al. | 214/518 X |
| 3,894,646 | 7/1975 | Head et al. | 214/522 |

*Primary Examiner*—Albert J. Makay
*Attorney, Agent, or Firm*—Andrus, Sceales, Starke & Sawall

[57] ABSTRACT

A self-unloading forage wagon of the type in which the floor of the box of the wagon is 30 to 40 inches from the ground with the rear of the wagon closed by a single tailgate hinged at the bottom to the box and which extends above the opening at the back of the wagon. Apron unloading chains in the bottom of the box of the wagon which are driven rearwardly by a source of power in turn effect a drive of unloader chains rearwardly on the tailgate to discharge a load of material such as hay, corn or the like from the wagon when the tailgate is lowered so that rear or upper end is in engagement with the ground.

3 Claims, 5 Drawing Figures

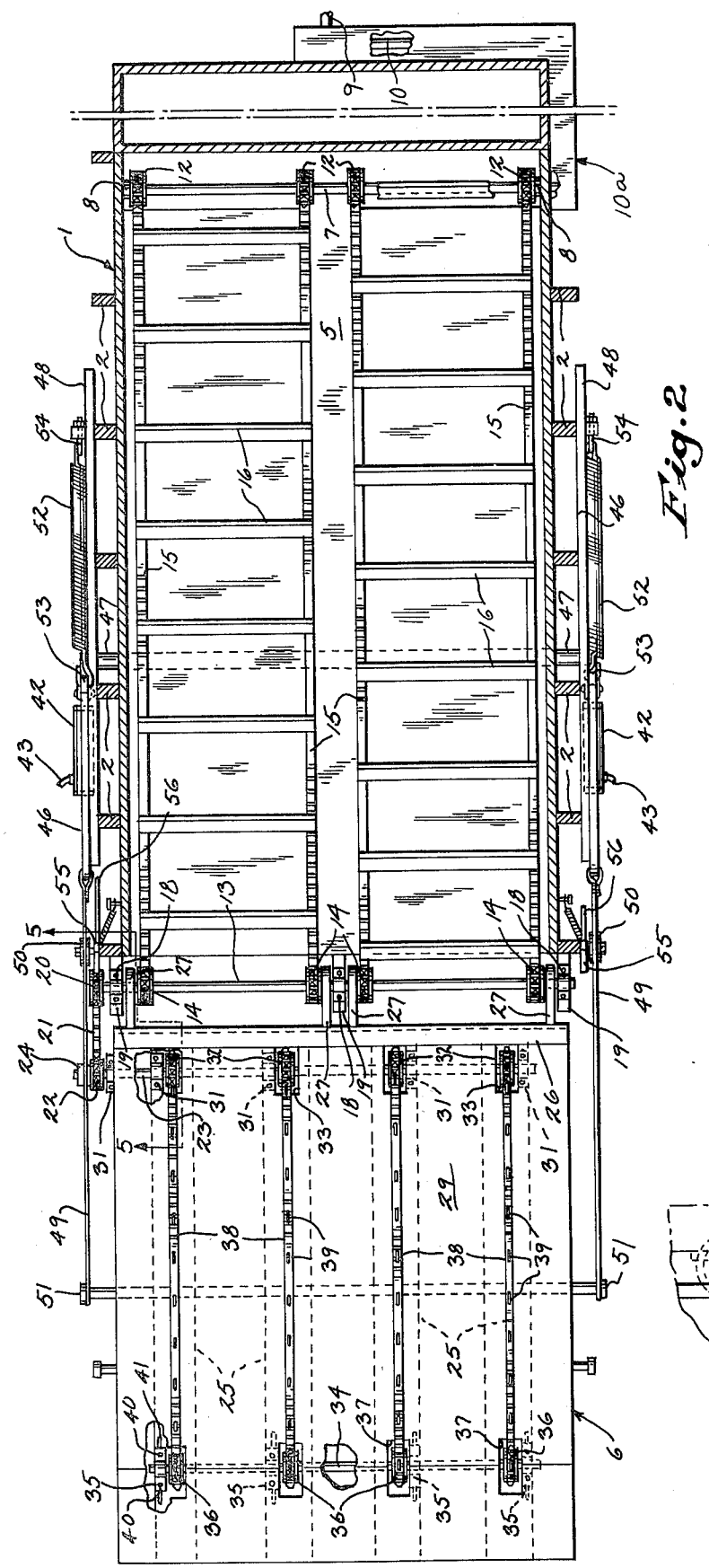
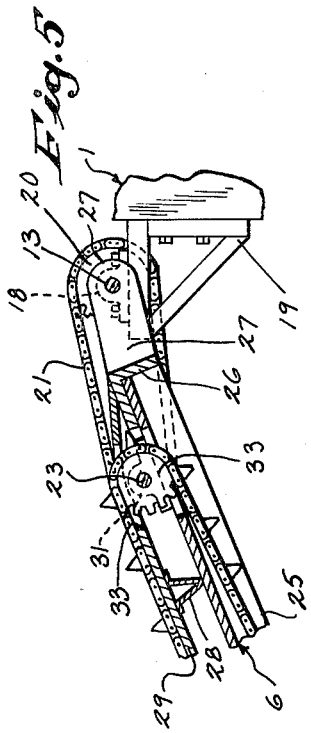
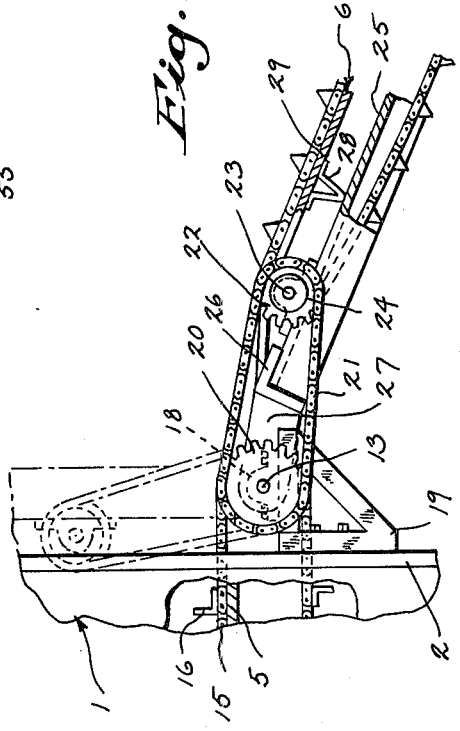

UNLOADING TAILGATE FOR SELF-UNLOADING FORAGE WAGON

BACKGROUND OF THE INVENTION

In prior practices in the discharge of a stack of hay from a stack maker, the stack maker is constructed so that the floor of the stack maker is only about eighteen to twenty inches from the ground. In the small stack makers the box does not tilt as the box is close enough to the ground. In large stack makers the box is hydraulically tilted upwardly at the forward end so that the back of the box is lowered close to the ground. Discharge of the stack is then accomplished after the box is tilted by the use of a half door or tailgate at the rear of the stack maker with a second half door which requires tilting upwardly or a pair of doors are used and opened laterally at the back of the stack maker. Unloading chains revolving rearwardly in the bed of the box move the stack rearwardly out of the wagon when the doors are opened laterally and when a half door has been used the unloading chains in the box have been aided by unloading chains on the rear half door when the door is sloped to the ground.

The tailgate unloading structure of the present invention employs a single tailgate on the rear of a self-unloading chopper or forage wagon which ordinarily extends above the rear opening of the wagon and when lowered to discharge a load of material from the wagon despite the height of the wagon box from the ground eliminates the necessity of tilting the wagon. The material can be unloaded without damaging such as the forming of cracks in a stack of hay which would subject the stack to injury from the weather.

SUMMARY OF THE INVENTION

The invention is illustrated by unloading a stack of hay from a chopper wagon but for the purposes of the description and claims the term load of material as used herein includes stacked as well as baled hay, corn stover, corn, straw and also green forage crops such as silage, legumes, and other feed or bedding materials which can be loaded into a chopper wagon and be discharged therefrom.

In general the invention consists of a self-unloading forage or chopper wagon, the bed or floor of which is approximately thirty to forty inches from the ground and above the wheels which support the wagon. The bed of the wagon is provided with the usual apron chains which have scrapers thereon to engage the bottom of the load of material located within the wagon box. The apron chains are revolved rearwardly rather than forwardly by sprockets located on a shaft at the forward end of the wagon which is driven from a tractor so that the scrapers engage the load of material for movement rearwardly out of the wagon.

The apron chains at the rear of the wagon box drive sprockets which are secured to a shaft to rotate the latter and the shaft extends laterally across the rear of the wagon box. A sprocket is also located on the outer end of the rear wagon shaft and through a chain which engages a sprocket on the forward tailgate shaft which extends laterally of the tailgate effects rotation of the tailgate shaft. The tailgate is hinged at the inner end to the rear of the wagon box. A plurality of intermittently spaced sprockets are secured to the tailgate shaft and are driven by the shaft. Roller chains having lugs thereon extend over the intermittently spaced sprockets and idler sprockets longitudinally spaced therefrom on a rear tailgate shaft and are rotated over and under the tailgate around the drive sprockets and the idler sprockets. The tailgate is covered by a smooth surfaced guide plate in which the sprockets are embedded and is rigidly supported. Rotation of the roller chain is rearwardly and the tailgate receives the load of material as it is discharged from the wagon box and the roller chains and lugs thereon discharge the stack of hay onto the ground from the downwardly sloping tailgate as the wagon is slowly pulled forwardly by a tractor to which it is hitched. The outer end of the tailgate is provided with skids which support the tailgate on the ground.

The tailgate is lowered and raised on the hinges securing it to the rear of the wagon box by hydraulic cylinders located on each side of the wagon box which are operated from the tractor to which the forage wagon is hitched. The cylinder operates levers and cables to accomplish the raising and lowering of the tailgate.

If desired, the tailgate may be latched when in the upward position by a rope or cable attached to a latch on each side of the wagon box and operated by the driver of the tractor.

DESCRIPTION OF THE DRAWING FIGURES

FIG. 2 is a section taken on line 2—2 of FIG. 1;

FIG. 4 is a side view of the tailgate drive connection with parts broken away and sectioned; and FIG. 5 is a sectional view taken on line 5—5 of FIG. 2.

DESCRIPTION OF THE ILLUSTRATED EMBODIMENTS

Figure 1:
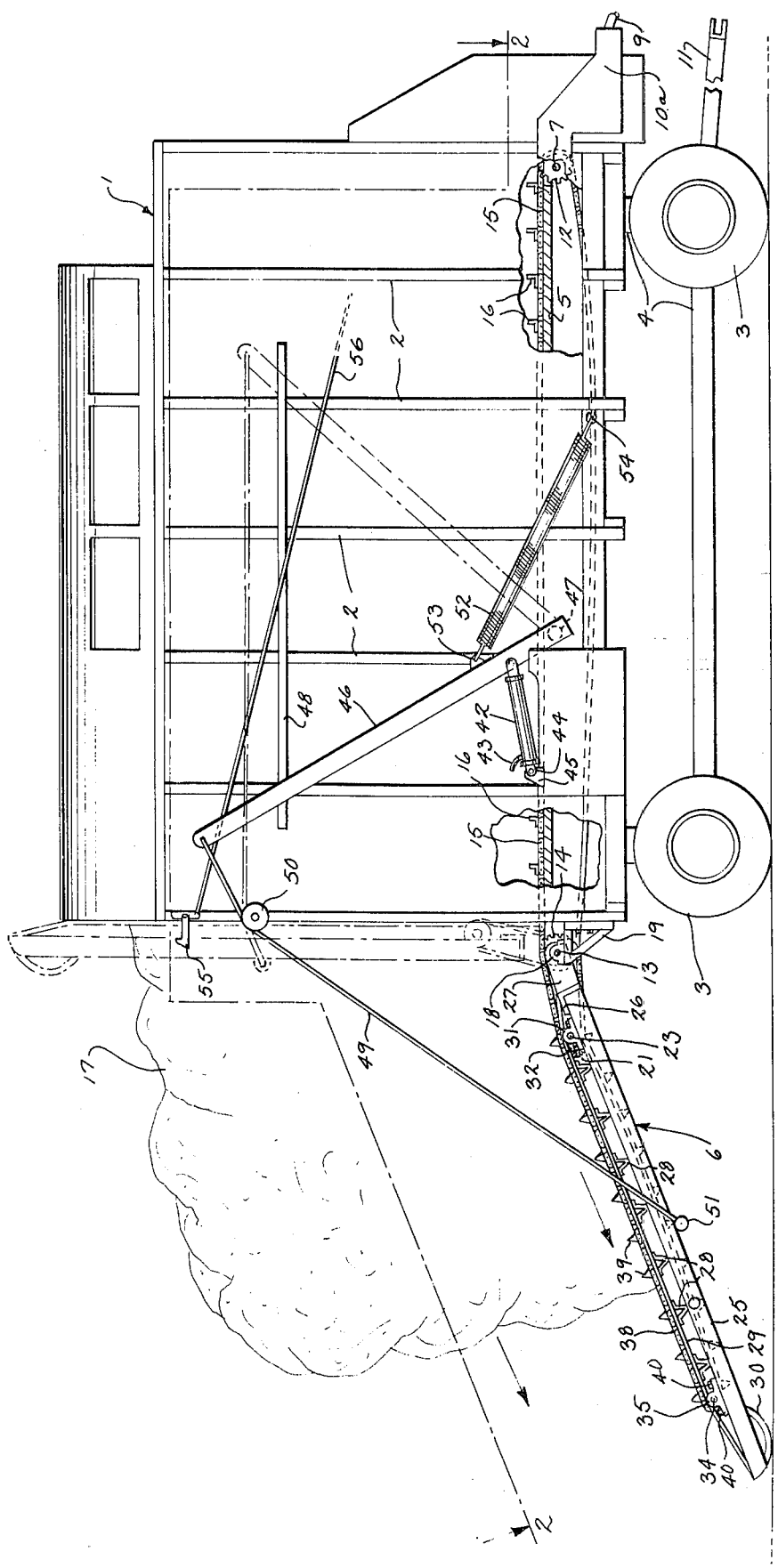
FIG. 1 is a side elevation of the forage wagon of the invention with parts broken away and sectioned and with the tailgate in an unloading position and showing a stack of hay in phantom in a partially discharged position.

Referring to the drawings, there is shown a covered forage or chopper wagon which consists of a reinforced covered box 1 which is reinforced on the sides by the spaced vertical reinforcing members or two-by-fours 2. The box is supported on the ground by the wheels 3 which are suspended from the usual chassis 4 which also supports the floor 5 of box 1. The front of the box is open at the top for loading material into box 1 and the rear is normally closed by the tailgate 6.

Referring to FIG. 2 an elongated shaft 7 extends laterally at the front of box 1 forwardly of floor 5 and is rotatably supported at each end within the bearings 8 which are secured to box 1.

Shaft 7 is driven by power takeoff 9 which extends forwardly of box 1 and is connected to the tractor and driven therefrom. The takeoff 9 drives the shaft 10 which in turn drives a drive mechanism, not shown, located in housing 10a which rotates the front drive shaft 7. The wagon is of the type to be drawn by a tractor by means of the hitch 11 which extends beneath the floor 5 of wagon box 1 and is permanently secured to the wagon.

The front shaft 7 has two pair of laterally spaced sprockets 12 secured thereto.

A second shaft 13 extends across the rear of box 1 and two pair of laterally spaced sprockets 14 are secured to shaft 13 in longitudinal alignment respectively with the forward sprockets 12. An apron chain 15 extends around each respective aligned sprockets 12 and 14 so that there is formed two pair of laterally spaced chains 15 which may be rotated by forward shaft 7 over floor 5 of box 1 rearwardly and then returned to the front of the box 1 underneath the floor 5.

Each pair of chains 15 has longitudinal spaced scrapers 16 which are welded to the chain 15 and are in upstanding position when passing over floor 5 to engage and unload rearwardly a stack of hay 17 which may have been formed in the forage wagon or other forage material.

Figure 3:
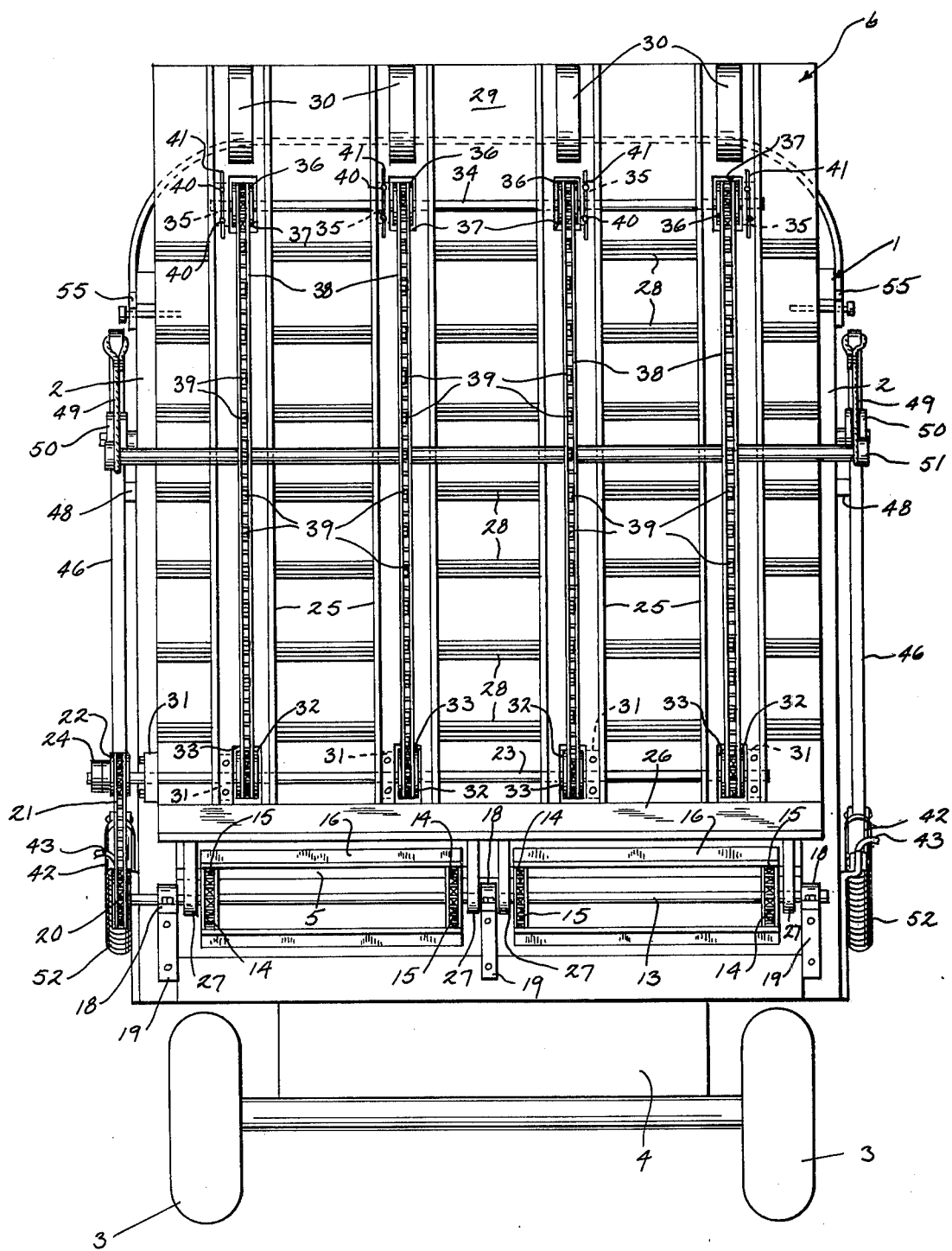
FIG. 3 is a rear view of the forage wagon with the tailgate in closed position.

The rear shaft 13 is supported within three laterally spaced bearings 18 as shown in FIG. 3 which are secured to the top of the laterally spaced mounting brackets 19 which in turn are bolted to the rear of box 1. Two of the bearings 18 are located adjacent the outer ends of rear shaft 13 as shown in FIG. 2. A bearing also is located in the center of shaft 13 on a bracket 19, although this is not shown for clarity in the drawing.

As illustrated in FIGS. 2 and 4, one end of rear shaft 13 projects outwardly a short distance from the side of box 1 and a sprocket 20 is secured to the projecting end of shaft 13 and is rotated by shaft 13.

Sprocket 20 is engaged by a short endless sprocket chain 21 and which engages and rotates a sprocket 22 secured to a projecting end of the tailgate shaft 23 located at the forward end of tailgate 6 to drive the latter. A slip clutch 24, as may be observed in FIG. 2, is secured to the outer end of tailgate shaft 23. Clutch 24 permits the stack 17 which is moved onto the tailgate 6 from the wagon box 1 to stop movement off the tailgate when forward movement of the wagon may be stopped momentarily or to stop unloading if forward movement of the wagon is slower than movement of the tailgate unloading chain.

Tailgate 6 is formed by four laterally spaced elongated channels 25 which extend for the entire length of the tailgate and the inner end of each channel 25 is welded to the angle iron 26 which extends across the rear of box 1. Tailgate 6 is hinged to the shaft 13 about which it is rotated by the laterally spaced hinges 27 and hinges 27 are welded to angle iron 26. Tailgate 6 is of a length preferably to extend slightly above box 1 of the wagon as may be observed in FIG. 1 of the drawing. A plurality of reinforcing stringers 28 of generally V-shaped construction with flanges at the upper free ends extend across and above the longitudinally extending channels 25 and the lower ends of stringers 28 are welded to the top of channels 25. The flat, smooth-surfaced sheet metal guide plate 29 overlies the stringers 28 and is pop riveted to the flanges of stringers 28. At the upper end the guide plate 29 also overlies angular shaped channel 26 so that there is a space of only several inches between floor 5 of box 1 and guide plate 29. If desired, tailgate 6 may be further reinforced along the sides by angle irons, not shown. The skids 30 are welded to the outer or upper ends of channels 25 and engage the ground when tailgate 6 is in unloading position.

Tailgate shaft 23 is supported adjacent the inner or lower end of tailgate 6 by five lateral spaced bearings 31 each of which is bolted or otherwise secured to a channel 25 and includes a bearing 31 located adjacent to sprocket 22. A sprocket 32 is also supported on the forward tailgate shaft 23 adjacent each bearing 31 and projects slightly outwardly through slots 33 in sheet metal plate 29. Sprockets 32 are rotated when tailgate shaft 23 is rotated from rear shaft 13 of the wagon.

A second tailgate idler shaft 34 extends laterally at the outer or free end of tailgate 6 and is supported in the four bearings 35 which are each secured to a respective channel 25. Adjusting mounts may be substituted for the bearings. Adjacent each bearing 35, the idler shaft 34 supports a sprocket 36, each of which are usually fixed to shaft 34 and located in longitudinal alignment with a respective sprocket 32. Each sprocket 36 projects slightly outwardly through a respective slot 37 in guide plate 29. A drive roller chain 38 is secured around each pair of sprockets 32 and 36 and rotated outwardly by tailgate shaft 23 over the top of guide plate 29 and thence returns within channels 25 under the back of the guide plate.

Each chain 38 carries intermittently spaced lugs 39 which engage the stack of hay 17 delivered from box 1 to move it outwardly over tailgate 6. Slots 33 and 37 are of a size to permit rotation of chains 38 and lugs 39 therethrough without engagement with guide plate 29. The bearings 35 for idler shaft 34 have flanges through which extend bolts 40 and thence through slots 41 to permit movement of bearings 35 longitudinally of tailgate 6 to adjust the tightness of chain 38.

In order to raise and lower tailgate 6 there is provided hydraulic cylinder 42 on each side of the box 1 which is actuated by fluid supplied from the tractor through the respective hose or piping 43. Only one cylinder 42 and the accompanying lever mechanism need be described as both are the same. The cylinder 42 is anchored at the rear end by a pivotal connection 44 to the plate 45 which in turn is bolted to the reinforcing beams 2 and box 1.

The forward end of cylinder 42 is pivoted to the elongated lever arm 46 which is anchored at the lower end to box 1 by the pivotal connection 47. The upper end portion of arm 46 slides over the elongated guide member 48 which is secured to beam 2 and extends longitudinally of wagon box 1. A cable 49 is secured to the upper end of lever arm 46 and cable 49 extends over a pulley 50 which is secured to the side of box 1 at the rear and adjacent the upper end of the wagon box 1. Cable 49 then extends to a rod or pipe 51 to the ends to which it is secured. The rod or pipe 51 is welded to the bottom extensions of the channels 25 and extends across the tailgate 6 and projects slightly outward therefrom to receive cables 49. In order to maintain lever arm 46 under tension a coil spring 52 is connected at 53 to the lever arm 46 adjacent the lower end and by eye bolt connection 54 to the lower end of one of the two-by-fours or beams 2 located forwardly of the wagon box 1. Eye bolt connection 54 provides for adjusting the tension of spring 52.

FIG. 1 in side elevation in solid lines illustrates tailgate 6 in a lowered position and illustrates stack of hay 17 in a partially unloaded position with lever arm 46 in its rearmost position. FIG. 1 also illustrates in phantom tailgate 6 in a closed position with lever arm 46 in its foremost position.

Tailgate 6 may be latched in closed position by latches 55 secured to tailgate 6 and box 1 on each side of the tailgate and box 1, the latches being actuated by the operator from the tractor by a rope or cable 56 which extends along the side of box 1 to the latches 55 located at the rear of box 1.

In the operation of a self-unloading wagon and an unloading tailgate, hay is chopped in the field and loaded into the wagon box 1 to form stack 17 in wagon box 1. The wagon is drawn by a tractor, not shown, by means of hitch 11 to the place where stack 17 is to be deposited, and during the loading and hauling of the stack 17, tailgate 6 is normally closed and secured by latches 55. In closed position tailgate 6 preferably extends somewhat above the rear end of the wagon to provide a generally gradual sloping unloading platform when tailgate 6 is in unloading position.

When the tractor has hauled the unloading wagon in which stack of hay 17 is located to the location where it is to be deposited, the operator of the tractor stops the tractor and operates ropes 56 to release latches 55 on opposite sides of the rear of wagon box 1. He then actuates the hydraulic cylinders 42 on each side of box 1 to operate lever arms 46 and cables 49 and gradually lowers tailgate 6 to the ground to rest at the outer end on the skids 30.

Thereafter the operator of the tractor actuates power takeoff 9 to actuate the front shaft 7 of the wagon through shaft 10 and the drive mechanism in housing 10a which rotates forward sprockets 12 and at the same time the operator starts to slowly pull the wagon forward by means of hitch 11 by forward movement of the tractor.

Actuation of forward sprockets 12 starts rearward rotation of apron chains 15 and rear idler shaft 13 by means of sprockets 14 on shaft 13. The scrapers 16 on chain 15 as the latter rotates over and under floor 5 of box 1 engages stack 17 and starts to move it rearwardly out of the rear of the wagon.

In the meantime rotation of idler shaft 13 rotates sprocket 20 on the outer end of shaft 13 which through chain 21 and sprocket 22 rotates forward tailgate shaft 23. This results in rotation of sprockets 32 on shaft 23. Sprockets 32 drive sprockets 36 on the tailgate idler shaft 34 by means of the respective roller chains 38. Roller chains 38 revolve rearwardly over and under tailgate 6 and carry lugs 39. As hay stack 17 is gradually moved out of the wagon and onto tailgate 6, lugs 39 on roller chain 38 engage the bottom of stack 17 and move it over tailgate 6 and the stack 17 is gradually deposited on the ground as the tractor slowly pulls the wagon forwardly.

The long sloping tailgate unloader permits the use of the usual chopper wagon which normally has a floor some thirty to forty inches from the ground or at least above the wheels upon which the wagon box rides for unloading a load of material without an injury to the load which would disintegrate it or expose it internally to the elements. This discharge is accomplished without any necessity of tilting the wagon at the rear. It permits the use of a relatively inexpensive chopper wagon and provides versatility in that the operation of filling a second chopper or forage wagon in the field can be continued while the first chopper wagon is being hauled to the stack discharge location and the discharge of the stack accomplished.

The invention also eliminates the necessity of unloading the loading material in the field and then reloading or retrieving it at a later time to haul it to a storage or feeding area as is necessary with the present stack makers unless the operator stops loading the stack maker to then go and unload. Also, the invention eliminates costly machinery for making a stack of hay, for example, if the user of the invention already has a flail or forage chopper and wagons for filling silos or for direct feeding. The invention allows the user to unload a load of green cut forage directly into a feeder in one load or stack at a time. It also allows the user to unload baled hay from a hay baler with or without a bale thrower at an elevator or unloading area in a very short time with less damage to bales and then return to the field, all while another wagon is being loaded in the field. The invention allows the user to unload a load or stack of material formed in a chopper wagon which is about two times as long as wide in one piece and then at a later time cut the stack in half crosswise and which can be handled very easily with a normal manure loader, thus eliminating special moving or handling equipment. The invention also permits the user to make hay or silage on the same day with the same forage or chopper wagon.

Various modes of carrying out the invention are contemplated as being within the scope of the following claims particularly pointing out and distinctly claiming the subject matter which is regarded as the invention.

I claim:

1. An unloading tailgate for a self-unloading chopper wagon to increase the versatility of the wagon which comprises a wagon box having a floor supported on a chassis in turn supported on wheels with the floor of the wagon located above the uppermost extent of the wheels of the wagon and adapted at the forward end to be hitched to a tractor, at least one unloading chain supported by rear and forward shafts disposed in said box and adapted to be driven rearwardly over the floor of the box when the shafts are rotated from the tractor, upstanding members intermittently secured to the chain to engage the bottom of a load of material located in the wagon and unload the material rearwardly when the chain is rotated, a single door at the rear of the wagon consisting of an unloading tailgate hinged at the lower end to the rear of the wagon and extending upwardly completely over the rear opening in the wagon box, a plurality of laterally spaced inverted supporting channels extending longitudinally of the tailgate, reinforcing stringers extending across the top of the channels, an angle iron member secured to the forward end of the channels, hinges secured to the angle iron and pivoted to the rear of the wagon box for pivotal movement of the tailgate, and a flat guide plate secured to the stringers and extending over the angle iron members substantially to the floor of the wagon box to provide a smooth surface for discharging the load of material, means secured to the tailgate and the wagon and actuated from the tractor to pivot the tailgate to a closed position or swing the tailgate so that it gradually slopes from the rear of the box to the ground, and at least one unloading chain revolved rearwardly over the tailgate by the unloading chain in the box and having upstanding means intermittently secured thereto to engage and unload the load of material received from the box onto the ground, the said tailgate having a minimum angle of slope from the rear of the wagon to the ground to unload the stored material without cracking or otherwise damaging the load of material and thereby subject it to disintegration or deterioration by the elements as the tractor pulls the chopper wagon forwardly.

2. The unloading tailgate of claim 1 and in which the forward shaft is a drive shaft located transversely of the forward end of the floor, a power takeoff connected to the drive shaft and adapted to be driven by the tractor to rotate said shaft, and the rear shaft is a rotatable idler shaft located transversely of the rear end of the floor and projecting outwardly therefrom at one end, longitudinally aligned sprockets secured to the drive shaft and idler shaft, and the unloading chain with the upstanding members thereon encircling the sprockets on the forward and rear shafts and rotated rearwardly thereby over the floor to engage and discharge the load material rearwardly from the wagon box, laterally spaced bearing members secured to the channels of the tailgate at the forward end position of the latter, a forward shaft rotatably lodged in said bearings, and having one end projecting outward therefrom in line with the rear shaft of the wagon box, aligned sprockets secured to the projecting ends of the idler and tailgate shafts, and the tailgate unloading chain being a sprocket chain encircling the last named sprockets to rotate the forward tailgate shaft, a plurality of laterally spaced sprockets secured to the forward tailgate shaft within slots provided in the guide plate, laterally spaced bearing members secured to the channels adjacent the rear of the tailgate, a rear rotatable idler shaft lodged in said last named bearings, a plurality of laterally spaced idler sprockets secured to the idler shaft and longitudinally aligned with the sprockets on the forward shaft of the tailgate, said idler sprockets extending through slots in the guide plate, and the unloading chain with the upstanding means encircling the longitudinally aligned sprockets on the respective tailgate shafts to be driven from the rear wagon box shaft rearwardly over the guide plate and thence return under the guide plate to the forward end of the tailgate thereby engaging the stack of hay discharged from the wagon box and unloading the same to the ground when the tailgate is in a lowered position.

3. The unloading tailgate of claim 2 and a slip clutch secured to the projecting end of the forward tailgate shaft outwardly of the sprocket thereon to stop rotation of the forward tailgate shaft in the event the wagon is being pulled too slowly or is stopped.

* * * * *